(12) United States Patent
Arai et al.

(10) Patent No.: US 7,397,210 B2
(45) Date of Patent: Jul. 8, 2008

(54) CONTROL UNIT FOR ELECTRIC POWER STEERING APPARATUS

(75) Inventors: Kenji Arai, Gunma (JP); Yuho Aoki, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 122 days.

(21) Appl. No.: 10/575,255

(22) PCT Filed: Oct. 6, 2004

(86) PCT No.: PCT/JP2004/015088
§ 371 (c)(1),
(2), (4) Date: Apr. 10, 2006

(87) PCT Pub. No.: WO2005/036103
PCT Pub. Date: Apr. 21, 2005

(65) Prior Publication Data
US 2007/0132414 A1    Jun. 14, 2007

(30) Foreign Application Priority Data
Oct. 10, 2003    (JP) .............................. 2003-352275

(51) Int. Cl.
*H02K 17/32*    (2006.01)
(52) U.S. Cl. .......................... 318/434; 318/445; 318/466
(58) Field of Classification Search .................. 318/52, 318/66, 432–434
See application file for complete search history.

(56) References Cited

FOREIGN PATENT DOCUMENTS

| JP | 60-88315 A | 5/1985 |
| JP | 61-18387 A | 1/1986 |
| JP | 62-158302 U | 10/1987 |
| JP | 2000-184774 A | 6/2000 |
| JP | 2000-241197 A | 9/2000 |

*Primary Examiner*—Lincoln Donovan
*Assistant Examiner*—Michael Brandt
(74) *Attorney, Agent, or Firm*—Sughrue Mion, PLLC

(57) ABSTRACT

In the present invention, only an abnormality of detection of a rotating direction of a motor is detected and therefore, with simple processing and by using a table for judging the abnormality of the detection of a rotating direction of a motor and the rotating direction of the motor, the abnormality of the detection of a rotating direction and the rotating direction of the motor are judged at one time.

4 Claims, 8 Drawing Sheets

| HS3 (bit 2) | HS2 (bit 1) | HS1 (bit 0) | S |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

| $S_n$ \ $S_{n-1}$ | 1 | 2 | 3 | 4 | 5 | 6 |
|---|---|---|---|---|---|---|
| 1 | 0 | E | CW | E | CCW | E |
| 2 | E | 0 | CCW | E | E | CW |
| 3 | CCW | CW | 0 | E | E | E |
| 4 | E | E | E | 0 | CW | CCW |
| 5 | CW | E | E | CCW | 0 | E |
| 6 | E | CCW | E | CW | E | 0 |

| $S_n$ \ $S_{n-1}$ | 0 | 1 | 2 | 3 | 4 | 5 | 6 | 7 |
|---|---|---|---|---|---|---|---|---|
| 0 | E | E | E | E | E | E | E | E |
| 1 | E | 0 | E | CW | E | CCW | E | E |
| 2 | E | E | 0 | CCW | E | E | CW | E |
| 3 | E | CCW | CW | 0 | E | E | E | E |
| 4 | E | E | E | E | 0 | CW | CCW | E |
| 5 | E | CW | E | E | CCW | 0 | E | E |
| 6 | E | E | CCW | E | CW | E | 0 | E |
| 7 | E | E | E | E | E | E | E | E |

CONTROL UNIT FOR ELECTRIC POWER
STEERING APPARATUS

TECHNICAL FIELD

The present invention relates to a control unit for an electric power steering apparatus for applying a steering assist force by a motor to a steering system of an automobile or a vehicle and especially to a control unit for an electric power steering apparatus for carrying out detection of a rotational direction of a motor and the like with low-cost sensors.

BACKGROUND ART

An electric power steering apparatus for applying a steering assist force to a steering mechanism of an automobile by a rotating force of a motor transmits a driving force of the motor by a transmitting mechanism such as a gear or a belt through a reduction gear to apply the steering assist force to a steering shaft or a rack shaft. An example of a structure of such an electric power steering apparatus is shown in FIG. 1 and will be described.

A shaft 102 of a steering wheel 101 is coupled to tie rods 106 of steered wheels through a reduction gear 103, universal joints 104a and 104b, and a pinion rack mechanism 105. The shaft 102 is provided with a torque sensor 107 for detecting steering torque of the steering wheel 101, and a motor 108 for assisting a steering force of the steering wheel 101 is coupled to the shaft 102 through the reduction gear 103. The motor control of the electric power steering apparatus is controlled by a control unit 109 by inputting a torque value detected by the torque sensor 107, a vehicle speed detected by a vehicle speed sensor (not shown), a rotation angle of the motor detected by a Hall sensor 110, and the like to the control unit 109. The control unit 109 is mainly composed of a CPU and performs a motor control by using a internal program in the CPU.

In this electric power steering apparatus, the motor 108 is an important object to be controlled and a rotation angle sensor and a rotation position sensor are mounted to a rotor of the motor 108 to detect actual rotation angle and rotation position which are used for the motor control. At the same time as this, those sensors are monitored whether they are operating properly or not. An example of the motor control of such an electric power steering apparatus will be described by using a disclosure of Japanese Patent Application Laid-open No. 2000-184774.

FIG. 2 is a block diagram of a motor control disclosed in the above official gazette and a basic operation of the motor control is as follows. First, a magnetizing current command value id* and a torque current command value iq* represented by a d axis and a q axis are obtained. Next, current iu, iv, and iw actually passing through a motor M is measured and converted from three phase to two phase to obtain feedback current idf and idq. Deviations of the feedback current idf and the current iqf from the magnetizing current command value id* and the torque current command value iq* are calculated, respectively, and the deviations are input to a proportional integral circuit (PI circuit) to calculate voltage command values Vd*, Vq*. The calculated voltage command values Vd*, Vq* are converted from two phase to three phase to calculate three-phase voltage command values Vu, Vv, Vw. Command values of a PWM control are determined based on the voltage command values Vu, Vv, Vw, and a driving circuit performs a PWM control of the motor M based on the command values.

Here, a rotation angle sensor and a Hall element 216 as a position detecting sensor are mounted to the motor M. An angle θ of the rotor is calculated in an angle detecting circuit 210 based on a signal detected by the rotation angle sensor, Hall sensor signals from the Hall element 216 and the angle θ of the rotor are input, and an abnormality of the rotation angle sensor and an abnormality of the Hall element are detected by an abnormality detection processing circuit 200.

In this abnormality detection processing circuit 200, a detection abnormality of the Hall element 216 and a detection abnormality of the angle θ of the rotor are detected.

With this method of detecting the abnormality of the rotation angle sensor and the abnormality of the Hall element 216 which is the position detecting sensor, only the abnormal condition of the Hall element 216 which is the position detecting sensor is detected, so a rotational direction when the Hall element 216 is operating normally cannot be detected. Moreover, processing takes much time in referring to a table of criteria of judgment for judging whether the sensors are abnormal or normal, because a plurality of conditional statements are used. Moreover, because both the rotation angle sensor and the Hall element 216 are used, an abnormality judging processing becomes complicated.

The present invention has been made with the above-described circumstances in view and it is an object of the invention to provide a control unit for an electric power steering apparatus with which, by using simple position detecting sensors such as the Hall sensors, it is possible to judge an abnormality of rotational direction detection or a rotational direction when the rotational direction detection is normal in a short processing time and it is possible to detect a steering wheel relative steering angle by using information about the obtained rotational direction.

DISCLOSURE OF THE INVENTION

The present invention relates to a control unit for an electric power steering apparatus for applying a steering assist force by a motor to a steering system of a vehicle. To achiever the above object of the invention, the control unit comprises: a plurality of position detecting sensors for detecting a rotation position of the motor and outputting it as binary outputs; a state function calculating means which calculates a output value of a state function for every predetermined time by inputting outputs of the plurality of position detecting sensors to the state function; and a judging means to be input the output values of the state function which respectively continued through the predetermined time, so as to judge a rotational direction of the motor or abnormality of rotational direction detection of the motor.

Furthermore, to achieve the above object of the invention, the state function is a function the output value of which is in a one-to-one relationship with the rotation position of the motor without redundancy or the control unit comprises relative steering angle calculating means for converting each of the clockwise rotation, the counterclockwise rotation, and the stop obtained from the rotational direction into a numerical value and integrating the numerical value every predetermined time to calculate a steering wheel relative steering angle or a column relative steering angle. Moreover, to achieve the above object of the invention, the control unit comprises steering velocity calculating means for calculating a steering wheel steering velocity or a colunm steering velocity by using the steering wheel relative steering angle or the colunm relative steering angle and the predetermined time.

BEST MODES FOR CARRYING OUT THE INVENTION

A basic theory of the present invention will be described and then concrete embodiments will be described.

Figure 1:
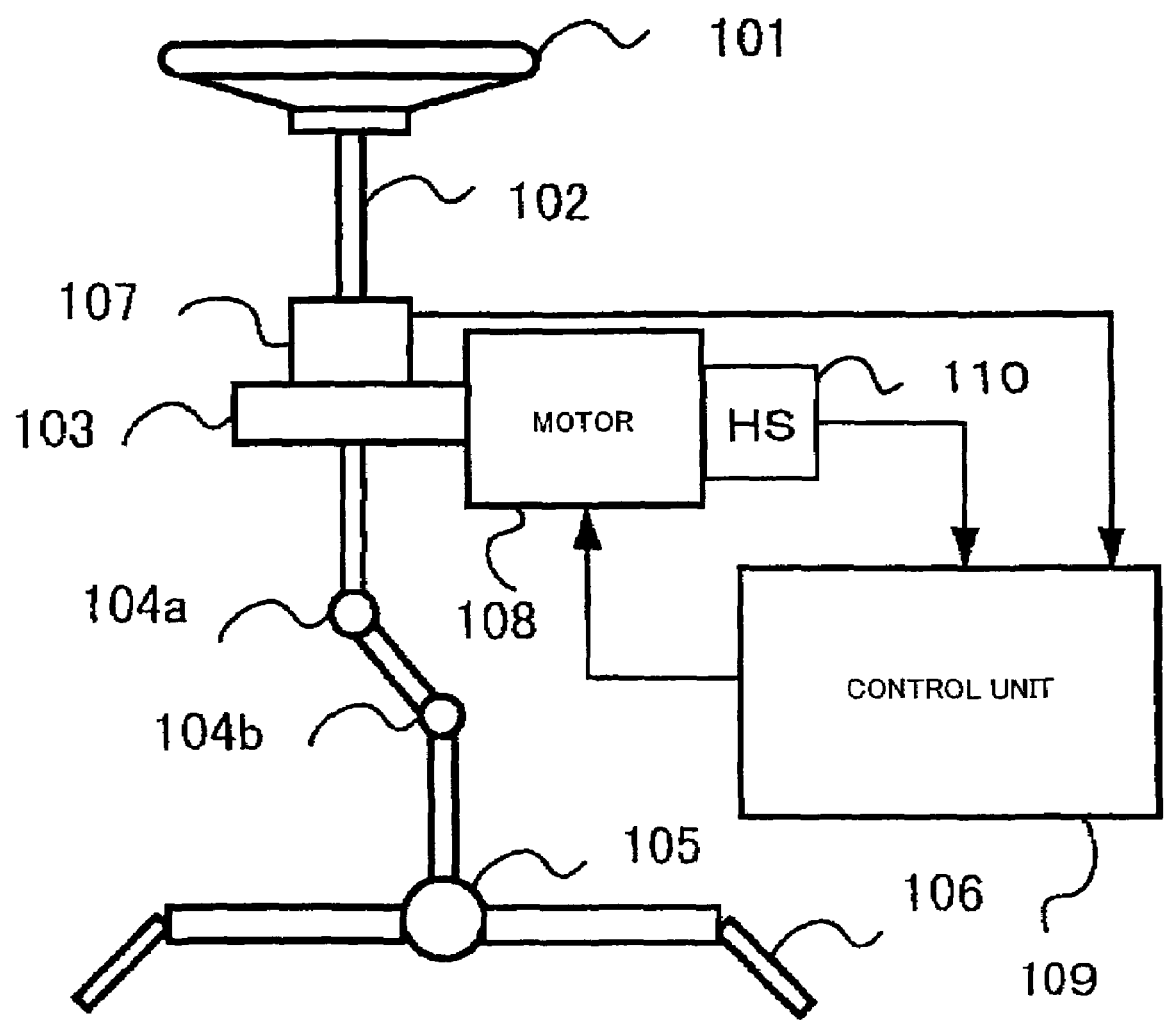
FIG. 1 is a drawing showing an example of a configuration of an electric power steering apparatus.
Figure 2:
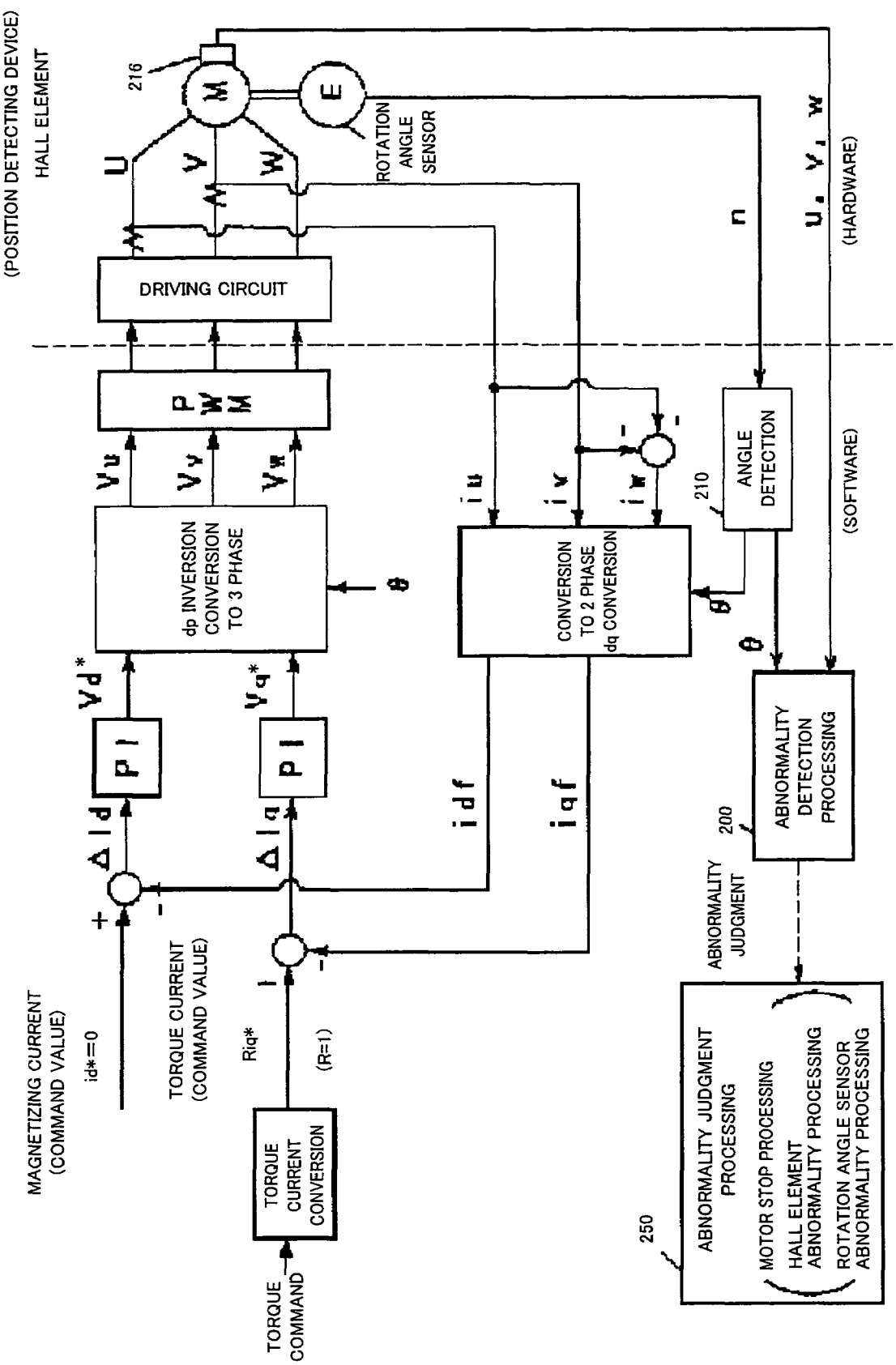
FIG. 2 is a block diagram showing an example of prior-art detection of an abnormality of motor rotational direction detection.
Figures 3, 4:
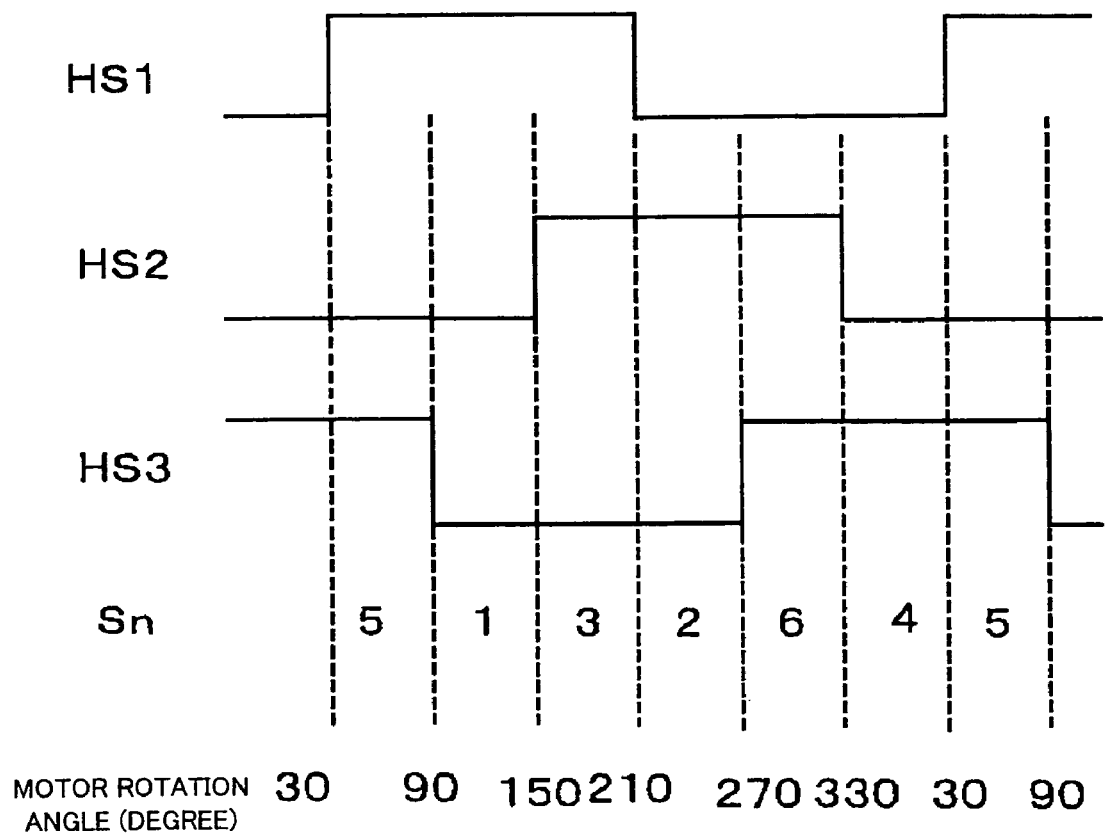
FIG. 3 is a drawing showing a relationship between a rotation position of a motor and an output value of a state function to which outputs of the Hall sensors are input.
FIG. 4 is a drawing showing relationships among the output values of the Hall sensors and a state value $S_n$.

A theory in detecting a position of a rotor while disposing three position detecting sensors HS1, HS2, and HS3 for detecting the position of the rotor of a motor will be described. As the position detecting sensor, a sensor such as a Hall sensor for outputting a binary signal is most suitable and is widely available as an inexpensive part. If the three Hall sensors are disposed at regular intervals of 120°, relationships among the binary outputs of them are shown in FIG. 3. The output of the position detecting sensor HS1 changes from "0" to "1" or from "0" to "1" at every 180° of the rotation angle. The output of the position detecting sensor HS2 changes from "0" to "1" or from "0" to "1" at every 180° of the rotation angle with a 120° phase shift from the output of the position detecting sensor HS1. The output of the position detecting sensor HS3 changes from "0" to "1" or from "1" to "0" at every 180° of the rotation angle with a 240° phase shift from the output of the position detecting sensor HS1 and with a 120° phase shift from the output of the position detecting sensor HS2.

Here, a state function to which the output values of the position detecting sensors HS1, HS2, and HS3 are input is determined. An output value of the state function is in a one-to-one relationship with each rotation position of the motor without redundancy. As an example, an expression (1) is utilized as the state function.

$$S = 4 \cdot \text{``}HS3\text{''} + 2 \cdot \text{``}HS2\text{''} + \text{``}HS1\text{''} \quad (1)$$
$$= 2^2 \cdot \text{``}HS3\text{''} + 2^1 \cdot \text{``}HS2\text{''} + 2^0 \cdot \text{``}HS1\text{''}$$

Here, "HS1", "HS2", and "HS3"are the output values of the position detecting sensors HS1, HS2, and HS3, respectively, and take on either one of "0" and "1".

The state function S is not limited to the above expression (1) and another function may be used if an output value $S_n$ (hereafter referred to as a "state value $S_n$") of the state function S is in a one-to-one relationship with the rotation position of the motor without redundancy.

FIG. 3 shows a result of calculation of the state function S of the expression (1). From FIG. 3, it can be understood that the position of the rotor of the motor at every 60° is in a one-to-one relationship with the state value $S_n$. In FIG. 3, a direction of a rightward movement, e.g., a direction in which the value of the state function S moves from "5" to "1" and from "1" to "3" is a clockwise rotation (hereafter referred to as CW). Reversely, a direction of a leftward movement, e.g., a direction in which the value of the state function S moves from "5" to "4" and from "4" to "6" is a counterclockwise rotation (hereafter referred to as CCW).

Relationships among the output values of the respective position detecting sensors HS and the output value $S_n$ of the state function S are as shown in FIG. 4. In FIG. 4, although "0" and "7" of the state value $S_n$ are not defined as rotation positions, they are listed in the table, because they are possible to exist as the output values of the state function S. To put it concretely, when one of the Hall sensors gets out of order and the output of the broken-down sensor is constantly "0" or "1", "0" or "7" exist as the state value $S_n$.

Figures 5, 6, 7:
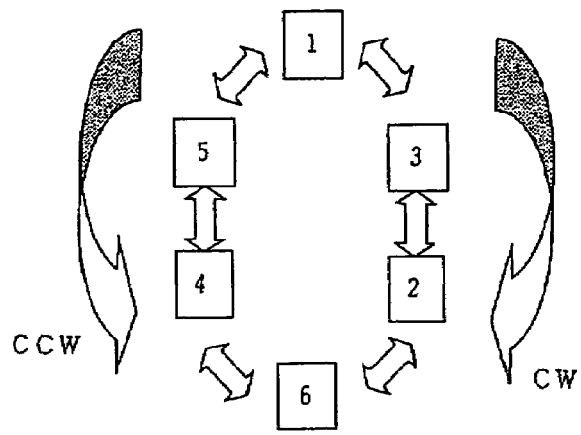
FIG. 5 is a drawing showing a relationship between a rotational direction of the motor and the state value $S_n$.
FIG. 6 is a drawing showing relationships among state values $S_n$, $S_{n+1}$ before and after a predetermined time, the rotational direction, and the abnormality of the rotational direction detection.
FIG. 7 is a drawing showing relationships among state values $S_n$, $S_{n+1}$, the rotational direction, and abnormality of the rotational direction detection with abnormalities of the Hall sensors in view.

FIG. 5 is a drawing for making relationships between CW and CCW which are the rotational directions and the output value of the state value $S_n$ easy to understand and shows the relationship between the rotational direction of the motor and the state value $S_n$. It can be understood from FIG. 5 that a relationship of movement from a certain state value $S_n$ to another state value $S_{n+1}$ is fixed. For example, if the state value $S_n$ is "1", then the value certainly moves to "3" in a case of the direction CW while moves to "5" in a case of the direction CCW. Therefore, the state value $S_n$, does not directly move from "1" to "2", "4", or "6" and such movement is regarded as abnormal.

A relationship of a change of the state value $S_n$ from a certain time point to the next time point is shown in FIG. 6. FIG. 6 shows a relationship between a state value $S_{n-1}$ which is an output value of the state function S at a certain time point and the next state value $S_n$. In FIG. 6, if the state value $S_{n-1}$ at a certain time point is "1" and the next state value $S_n$ is "3", the rotational direction is CW and therefore "CW" is indicated in a position of a point of intersection of the state value $S_{n-1}$ and the state value $S_n$ in FIG. 6. If the next state value $S_n$ is "5", the rotational direction is CCW and therefor "CCW" is indicated in a position of a point of intersection of the state value $S_{n-1}$ and the state value $S_n$. Here, if the state value $S_{n-1}$ is "1" and the state value $S_n$ is "1", this represents a stop of rotation in which the motor does not rotate and is at a standstill in the same position and therefore "0" is indicated in a position of a point of intersection of the state value $S_{n-1}$ and the state value $S_n$. Incidentally, if the state value $S_{n-1}$ is "1" and the state value $S_n$ is "2", "4", or "6"; this represents an abnormality and therefore "E" is indicated.

If a failure of the Hall sensor is considered, "0" and "7" of the state value $S_n$ exist and therefore FIG. 7 indicates. every case. Therefore, "E" is indicated at very intersection with "0" or "7" of the state value $S_{n-1}$ or $S_n$ premised on the abnormality of the Hall sensor.

FIG. 7 means that the rotational direction of the motor and abnormality of rotational direction detection of the motor can immediately be judged if a state value $S_n$ at a certain time point and a state value $S_{n+1}$ at the next time point are obtained. This relationship is defined as in an expression(2).

$$X=T[S_{n-1}][S_n] \quad (2)$$

According to the expression (2), rotation in the direction CW is output as "1", rotation in the direction CCW is output as "−1", a stop of rotation is output as "0", and the detection abnormality E is output as "127" as the output value X, because fhe relationship of the rotation in the direction CW, the rotalion in the direction CCW, the stop of rotation, or the detection abnormality is known from the relationship in FIG. 7 if the state value $S_{n-1}$ at a certain time point and a state value $S_n$ at the next time point are obtained. Therefore, it is possible to immediately recognize the rotational direction of the motor and abnormality of rotational direction detection of the motorby seeing the output X.

Next, a principle of detection of the relative steering angles will be described. From FIG. 7, if there is no detection abnormality, it can immediately be recognized that the motor is rotating in the direction CW, that the motor is rotating in the direction CCW, or that the motor is not rotating but at a standstill. Therefore, as the value of the output X defined in the expression (2), "1" is output in the case of the rotation in the direction CW, "−1" is output in the case of the rotation in the direction CCW, and "0" is output in the case of the stop of the rotation. If the three Hall sensors are disposed at regular intervals of 120°, "1" represents an amount corresponding to 60°. These angles of 120° and 60° represent electrical angles and hereafter angles represent electrical angles.

Therefore, if a relationship from a state value $S_n$ at a certain time point to a state value $S_{n+1}$ at the next time point is "1", it can be recognized that the motor rotates 60° in the direction CW. Then, if a relationship of a change from the state value $S_{n+1}$ to a state value $S_{n+2}$ is also "1", it can be recognized that the motor further rotates 60° in the direction CW. Reversely, if a relationship from a state value $S_n$ at a certain time point to a state value $S_{n+1}$ at the next time point is "−1", it can be recognized that the motor rotates 60° in the direction CCW. If a relationship from a state value $S_n$ at a certain time point to a state value $S_{n+1}$ at the next time point is "0", it means that the motor it not rotating but is at a standstill. Therefore, from the relationships in FIG. 7, the relative rotation position of the motor can be obtained by adding the output value X, i.e., "1", "−1", or "0" representing rotation in the direction CW, rotation in the direction CCW, or the stop, respectively to the previous state and integrating the addition results. In other words, an addition may be performed as shown in the following expression (3) to obtain an addition result.

$$C_{nt}=C_{nt}+X \quad (3)$$

In other words, if a result of an addition of the output value X to the previous addition result $C_{nt}$ is defined as a new addition result $C_{nt}$, addition results are integrated and the relative motor rotation angle can be calculated.

Next, from the number of times of rotation of the motor, a steering wheel steering angle $A_n$, and a column steering angle $B_n$, can be calculated. These steering wheel steering angle $A_n$, and column steering angle $B_n$ are steering angles used for calculating a steering wheel relative steering angle $R_A$ and a column relative steering angle $R_B$.

First, the steering wheel angle $A_n$ is calculated. In order to calculate the steering wheel steering angle $A_n$, a gear ratio of a worm and the like needs to be considered. This relationship is different depending on the electric power steering apparatus. In a case of a three-phase four-pole motor, the relationship is expressed as in an expression (4).

$$A_n=K \cdot C_{nt}+T_n/Kt \quad (4)$$

Here, $K=60°/2/G$. G represents the gear ratio of the worm gear. The second term, $T_n/Kt$ represents an angle of torsion of a torsion bar and the angle of torsion is also taken into consideration to perform the addition. $T_n$ represents a torque value detected at the same time as the state value $S_n$ and Kt represents a spring constant.

Next, the column steering angle $B_n$, is calculated. For the column steering angle $B_n$, the angle of torsion of the torsion bar in the expression (4) may be deleted and the column steering angle $B_n$ can be expressed as in the following expression (5).

$$B_n=K \cdot C_{nt} \quad (5)$$

Next, the steering wheel relative steering angle $R_A$ and the column relative steering angle $R_B$ are calculated. First, the steering wheel relative steering angle $R_A$ can be calculated as the following expression (6).

$$R_A=A_n-A_{n-m} \quad (6)$$

Here, $A_n$ represents a steering wheel steering angle at a certain time point and $A_{n-m}$ represents a steering wheel steering angle m steps before the certain time point. The steering wheel steering angles $A_n$ and $A_{n-m}$ are for the relative steering angle and therefore need not be absolutely accurate.

Likewise, the column relative steering angle $R_B$ can be expressed as in an expression (7).

$$R_B=B_n-B_{n-m} \quad (7)$$

Here, $B_n$ represents a column steering angle at a certain time point and the column steering angle $B_{n-m}$ represents a column steering angle m steps before the certain time point.

Finally, a steering wheel steering velocity Vh and a column steering velocity Vc are calculated.

First, in order to calculate the steering wheel steering velocity Vh, a time tm which has been required for changes of m steps is known and therefore the following expression (8) may be performed by using the steering wheel relative steering angle $R_A$ and the time tm.

$$Vh=R_A/tm \quad (8)$$

If tm is set at a time such as 100 ms, for example, the steering wheel steering velocity can be calculated directly from the expression (5).

Likewise, the column steering velocity Vc can be calculated by using the following expression (9) by using the column relative steering angle $R_B$ and the time tm.

$$Vc=R_B/tm \quad (9)$$

The above are theoretical description of judgment of the abnormality of the rotational direction detection or the rotational direction when the rotational direction detection is normal, and theoretical description of calculation of the steering wheel relative steering angle $R_A$, the column relative steering angle $R_B$, the steering wheel steering velocity Vh, and the column steering velocity Vc.

Next, the preferred embodiment of the invention will specifically be described based on the drawings.

Control processing which will be described below is performed every predetermined time. The predetermined time is a time required for 1 step from an n step which is a certain state to an (n+1) step which is the next state. This predetermined time is determined by considering all things such as performance of CPU of a control unit and detection velocities of detecting sensors.

Figure 8:
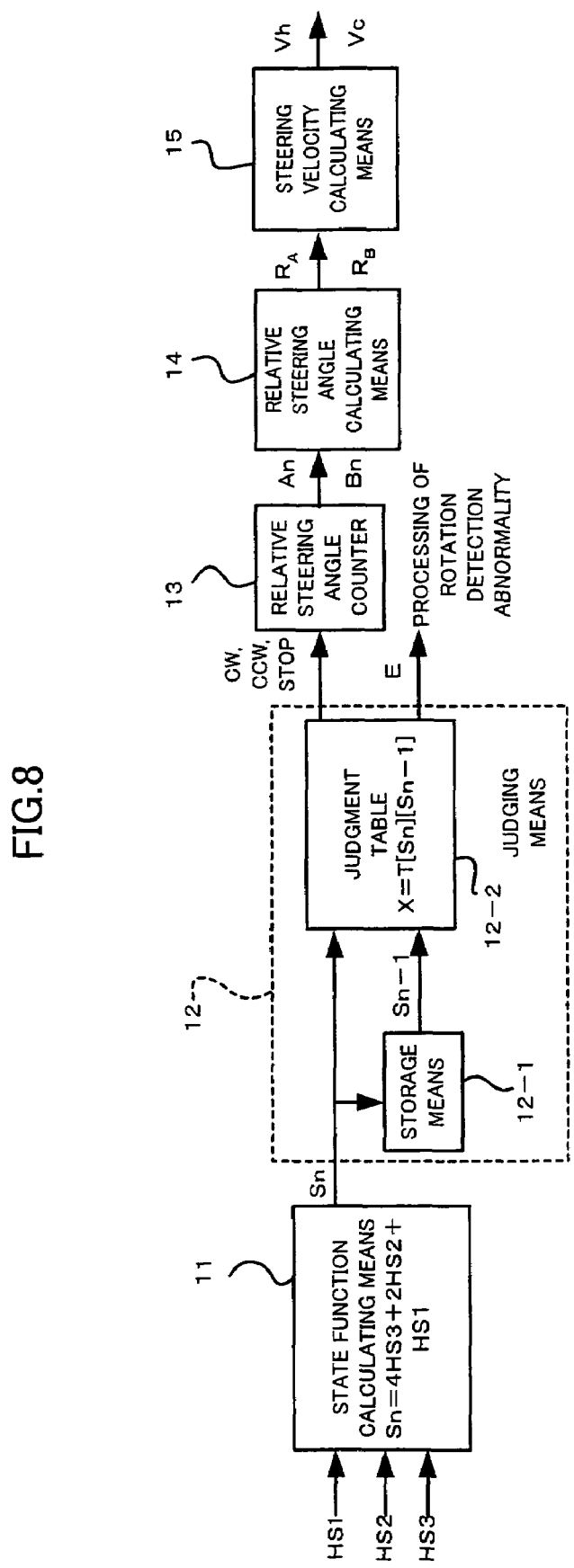
FIG. 8 is a block diagram showing an example of a configuration of a control of the invention.

FIG. 8 is a control block diagram for judging the abnormality of the rotational direction detection or the rotational direction when the rotational direction detection is normal by inputting the outputs of the Hall sensors.

The configuration includes the Hall sensors HS1, HS2, and HS3 disposed in the motor, state function calculating means 11 to which the outputs of the sensors are input, and judging means 12 to which an output of the state function calculating means 11 is input. The judging means 12 is further formed of storage means 12-1 and a judgment table 12-2. Ihe storage means 12-1 stores the state value $S_n$ which is the output of the state function calculating means 11 and outputs the state value $S_{n-1}$ of a state one step before the processed step to tlhe judgment table 12-2. The state value $S_n$ and the state value $S_{n-1}$ are input to the judgment table 12-2 and the table 12-2 outputs the judgmenl value X. The judgment table 12-2 is a table for judging the rotational direction and the abnormality of the rotational direction detection shown in FIG. 7.

Figure 9:
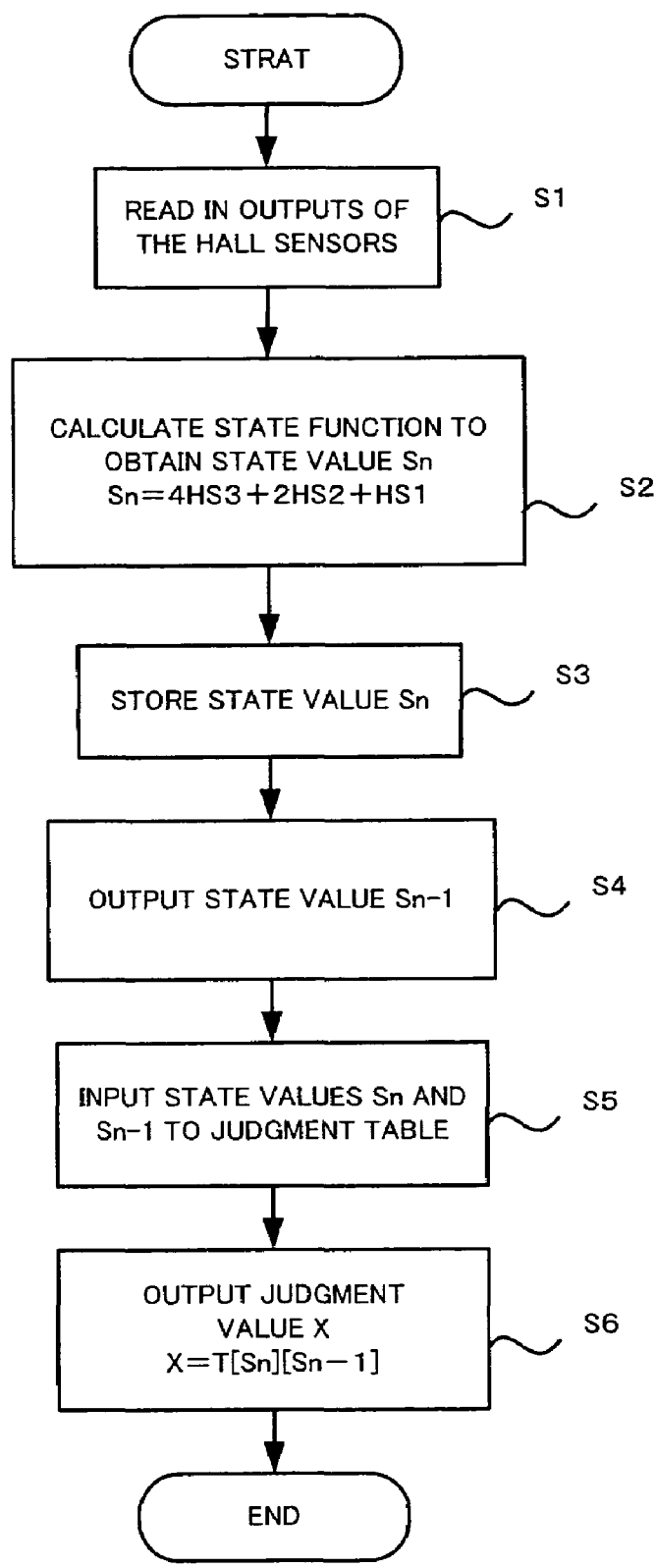
FIG. 9 is a flow chart showing an example of processing for judging the motor rotational direction and the abnormality of the rotational direction detection according to the invention.

In this configuration, operation of the configuration will be described by reference to a flow chart in FIG. 9.

The Hall sensors HS1, HS2, and HS3 which are the position detecting sensors output "0" or "1" which are binary outputs corresponding to the rotation position of the motor. The outputs "HS1", "HS2", and "HS3" of the Hall sensors are input to the state function calculating means 11 (step S1). In this state function calculating means 11, $S_n=4\cdot\text{"HS3"}+2\cdot\text{"HS2"}+\text{"HS1"}$ which is the expression (1) is calculated. The state value $S_n$ which is a result of this calculation is input to the judging means 12 (step S2). Calculation of the state function is performed every predetermined time.

The state value $S_n$ input to the judging means 12 is input to the storage means 12-1 and the judgment table 12-2. The storage means 12-1 stores the state value $S_n$ (step S3). Then, the storage means 12-1 outputs the state value $S_{n-1}$ one step before the processed step to the judgment table 12-2 (step S4).

To the judgment table 12-2, the state value $S_n$ and the state value $S_{n-1}$ which are output values of the state function before and after the predetermined time are input (step S5). The judgment table 12-2 immediately judges a relationship between the state value $S_n$ and the state value $S_{n-1}$. If the state value $S_n$ is "1" and the state value $S_{n-1}$ is "3", for example, the motor is rotating in the direction CCW. If the state value $S_n$ is "1" and the state value $S_{n-1}$ is "5", the motor is rotating in the direction CW. If the state value $S_n$ is "1" and the state value $S_{n-1}$ is "1", the motor is not rotating but at a standstill. If the state value $S_n$ is "1" and the state value $S_{n-1}$ is "6", the rotation detection is abnormal.

The output of the judgment table 12-2 is output as the output X of the expression (2). In other words, the table 12-2 outputs "1" in the case of the CW rotation, "-1" in the case of the CCW rotation, "0" in the case of the stop of rotation, and "E" or "127" in the case of the abnormality of the rotation detection (step 6).

It is an excellent effect of the invention that the rotational direction of the motor and the abnormality of the rotational direction detection can be detected without using a conditional statement by using the table. The output of the rotation detection abnormality can be utilized for performing failsafe processing corresponding to the abnormal state.

Figure 10:
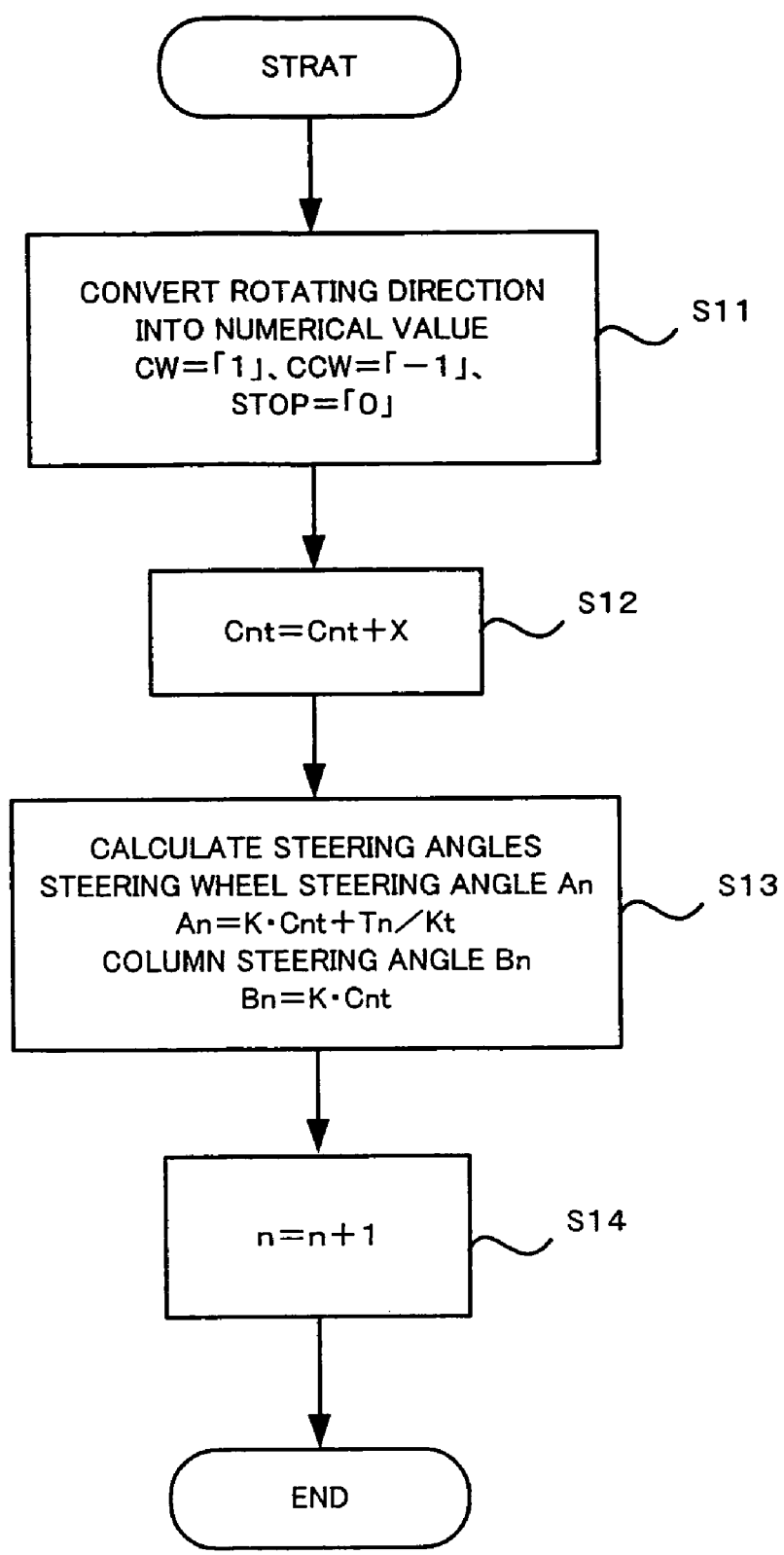
FIG. 10 is a flow chart showing an example of calculation of steering angles.
Figure 11:
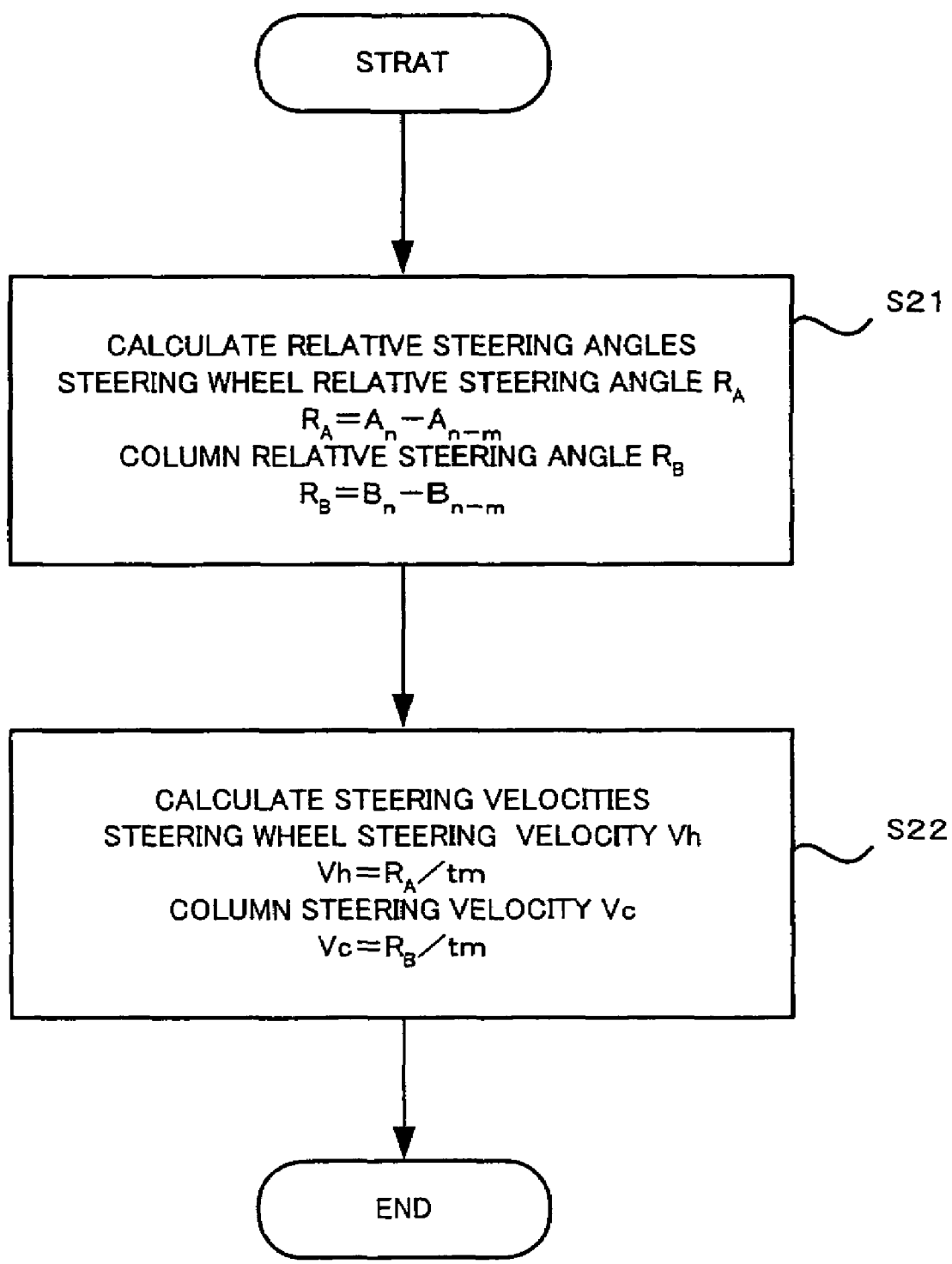
FIG. 11 is a flow chart showing an example of operation for calculating a steering wheel relative steering angle, a column relative steering angle, a steering wheel steering velocity, and a column steering velocity.

Next, an embodiment of calculation of the steering wheel relative steering angle RA and the column relative steering angle $R_B$ will be described by reference to flow charts in FIG. 10 and FIG. 11.

First, steering wheel steering angle $A_n$ and the column steering angle $B_n$ are calculated by a relative steering angle counter 13. The calculating procedure will be described by reference to the flow chart in FIG. 8. First, the CW rotation, the CCW rotation, the stop of rotation which are the rotational directions of the motor are converted into numerical values. In the present embodiment, the judgment table 12-2 carries out detection of the rotational direction and conversion of the rotational direction into the numerical value simultaneously. The CW rotation, the CCW rotation, and the stop of rotation are converted into "1", "-1", and "0", respectively. In other words, X takes on any of one"1", "-1", and "0"(step S11). Next, the numerical value X continues to be added every predetermined time, i.e., at every step to calculate the integrated value $C_{nt}$. In other words, an exppression, $C_{nt}=C_{nt}+X$ is performed and, as a result, X is integrated to calculate the integrated value $C_{nt}$ (step S12).

Next, based on the expression, $A_n=K\cdot C_{nt}+T_n/Kt$ defined by the expression (4) and based on the steering wheel steering angle $A_n$ and the expression, $B_n=K\cdot C_{nt}$ defined in the expression (5), the column steering angle $B_n$ is calculated (step S13). Here, the torque $T_n$ is a torque value at an n step. Finally, the counter finishes the n step and performs counting corresponding to the (n+1) step (step S14). The above is the operation of the relative steering angle counter 13.

Next, the steering wheel relative steering angle $R_A$, the column relative steering angle $R_B$, the steering wheel steering velocity Vh, and the column steering velocity Vc are obtained. The steering wheel relative steering angle $R_A$ and the column relative steering angle $R_B$ are calculated by the relative steering angle calculating means 14 and the steering wheel steering velocity Vh and the column steering velocity Vc are calculated by the steering velocity calculating means 15. The relative steering angle calculating means 14 performs the expressions (6) and (7) in the flow chart in FIG. 11. In other words, the steering wheel relative steering angle $R_A$ is calculated by subtracting a steering angle $A_{n-m}$ in a step m steps before the present n step from the steering angle $A_n$ in the present n step. The column relative steering angle $R_B$ is calculated by subtracting a column steering angle $B_{n-m}$ in a step m steps before the present n step from a column steering angle $B_n$ in the present n step (step S21).

Moreover, if the calculated steering wheel relative steering angle $R_A$ and column relative steering angle $R_B$ are divided by a time tm required for them steps, the steering wheel steering velocity Vh and the column steering velocity Vc are calculated, respectively (step S22).

As described above, with the control unit of the electric power steering apparatus of the invention, by converting the rotational direction of the motor into the numerical value and integrating the numerical value in every step, the steering wheel relative steering angle $R_A$ and the column relative steering angle $R_B$ can be obtained. Based on the callculated steering wheel relative steering angle $R_A$ and column relative steering angle $R_B$, the steering wheel steering velocity Vh and the column steering velocity Vc can also be calculated. Because an absolute steering angle is not especially calculated, it is possible to calculate: the steering wheel relative steering angle, the column relative steering angle, the stelering wheel steering velocity, and the column steering velocity with a simple algorithm.

Furthermore, with the control unit of the electric power steering apparatus of the invention, by inputting the outputs of the plurality of position detecting sensors to the state function calculating means to form the state function, it is possible to easily and judge the rotational direction of the motor or the abnormality of the rotational direction detection with the judging means for judging the change from the previous state function to the new one before and after the predetermined time and with the simple algorithm.

Moreover, by converting the detected rotational direction of the motor into the numerical value and integrating the numerical value every predetermined time, it is possible to accurately calculate the steering wheel relative steering angle and the column relative steering angle without calculating the absolute steering angle and with the simple algorithm. Also, it is an excellent effect that the accurate steering wheel steering velocity and column steering velocity can easily be calculated.

POSSIBILITIES OF INDUSTRIAL APPLICATION

With the control unit of the electric power steering apparatus according to the invention, by using simple position detecting sensors such as the Hall sensors, it is possible to judge the abnormality of the rotational direction detection or the rotational direction when the rotational direction detection is normal in a short processing time. Moreover, it is possible to detect the steering wheel relative steeling angle by using the obtained information about the rotational direction. Therefore, it is possible to achieve the high-performance electric power steering apparatus at a relatively low cost. Therefore, it is possible to achieve the high-performance electric power steering apparatus at a relatively low cost.

What is claimed is:

1. A control unit for an electric power steering apparatus for applying a steering assist force to a steering system of a vehicle, via a motor, the control unit comprising:

a plurality of position detecting sensors, each for detecting a rotation position of the motor and outputting it as a binary output;

a state function calculating means which calculates a state function value repeatedly, at a predetermined time interval, based on outputs of the plurality of position detecting sensors, and which outputs the state function values; and a judging means which receives the output state function values, and determines and outputs a judgment result;

wherein the judging means comprises a storage means and a judgment table, which outputs the judgment result; and wherein the judgment result is one of a clockwise rotation of the motor, a counterclockwise rotation of the motor, a stop of the motor, and an abnormality in the detection of the rotational direction of the motor.

2. The control unit for an electric power steering apparatus according to claim 1, further comprising:

a relative steering angle calculating means for converting each of the clockwise rotation of the motor, the counterclockwise rotation of the motor, and the stop of motor, obtained from the judging means, into a numerical value, integrating the numerical value repeatedly at the predetermined time interval, and calculating a relative steering angle of one of a steering wheel and a column.

3. The control unit for an electric power steering apparatus according to claim 2, further comprising:

a steering velocity calculating means for calculating a steering velocity of one of the steering wheel and the column, by using the relative steering angle of one of the steering wheel and the column, respectively and the predetermined time interval.

4. The control unit for an electric power steering apparatus according to claim 1, wherein the position detecting sensors are Hall sensors.

* * * * *